United States Patent [19]

Liszka

[11] Patent Number: 4,975,189

[45] Date of Patent: Dec. 4, 1990

[54] CLEANING SPRAYS FOR DISC FILTERS

[76] Inventor: John A. Liszka, 2265 de Montreuil, Montreal, Canada H3N 1X4

[21] Appl. No.: 281,836

[22] Filed: Dec. 9, 1988

[51] Int. Cl.$^5$ .............................................. B01D 33/50
[52] U.S. Cl. ............................... 210/327; 210/333.01; 210/411; 210/413; 210/427; 210/520; 239/243
[58] Field of Search ................... 239/66, 160, 161, 162, 239/163, 166, 168, 177.1, 227, 243, 538, 536; 210/327, 333.01, 391, 409, 411, 412, 413, 427, 520; 162/60; 68/181 R; 134/179

[56] References Cited

U.S. PATENT DOCUMENTS

| | | | |
|---|---|---|---|
| 1,592,452 | 7/1926 | Ferris et al. | 239/243 |
| 2,440,161 | 4/1948 | Vaudreuil | 239/243 |
| 3,471,026 | 10/1969 | Riker | 210/327 |
| 3,532,220 | 6/1970 | Lewis | 210/409 |
| 3,959,148 | 5/1976 | Krynski et al. | 210/334 |
| 4,760,717 | 8/1988 | Ponzielli | 68/181 R |

FOREIGN PATENT DOCUMENTS

| | | |
|---|---|---|
| 742507 | 9/1966 | Canada. |
| 1122539 | 4/1982 | Canada. |
| 1216527 | 1/1987 | Canada. |
| 411494 | 1/1910 | France .................. 239/243 |
| 735 | 1/1901 | United Kingdom ................. 239/243 |

OTHER PUBLICATIONS

Ingersoll Rand brochure, "Impco Disc Filter", Form No. C-A5-1.
Beloit-Jones brochure, "Polydisk Filters", SB 67-004 C.
Ingersoll Rand brochure, "Impco Disc Filter-Oscillating Shower", A5-5 0269.
Ingersoll Rand technical brochure, "Disc Filter with Knock-off Shower Sluicing Shower and Fixed Face Cleaning Shower".
BK 47 0175 (including figures 3-2A and 3-3A on pp. BK 46 1072 and BK 47 1069 respectively).

*Primary Examiner*—Richard V. Fisher
*Assistant Examiner*—Wanda L. Millard
*Attorney, Agent, or Firm*—Bacon & Thomas

[57] ABSTRACT

In rotating disc filters used for example in the pulp and paper industry, one or more spray elements are positioned between adjacent discs to rotate about an axis parallel to the disc axis. This arrangement achieves greater washing coverage of the discs than prior systems.

8 Claims, 2 Drawing Sheets

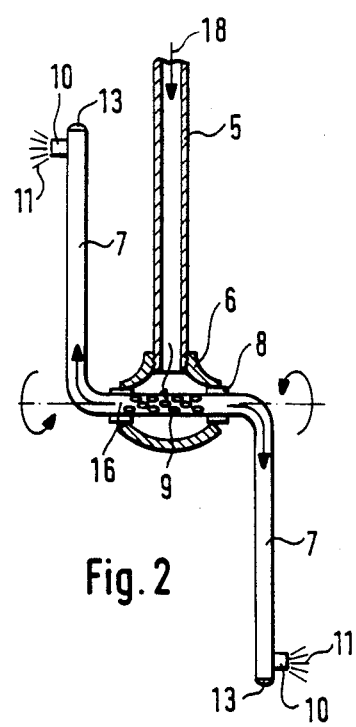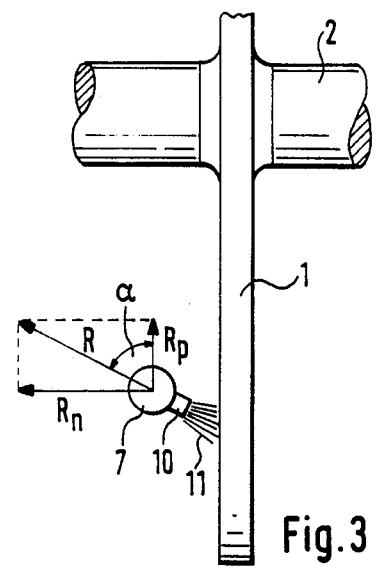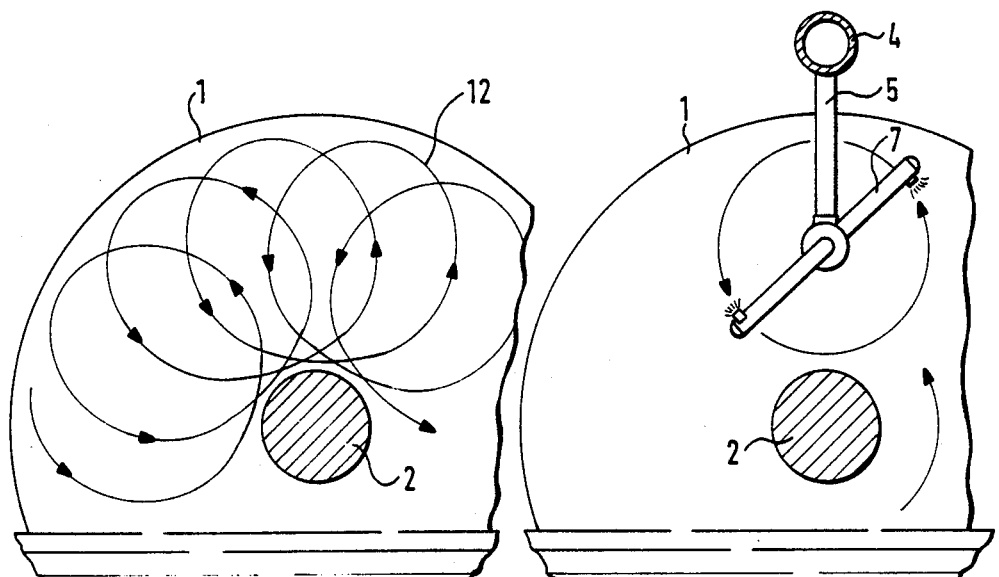

CLEANING SPRAYS FOR DISC FILTERS

BACKGROUND OF THE INVENTION (i) Field of the invention

This invention relates to spray elements for use in a rotating disc filter assembly.

(ii) Description of the Prior Art

Rotating disc filters are used in many industrial filtration processes. In the pulp and paper industry, such filters are used for pulp filtration and thickening in a so-called thermo-mechanical pulping (T.M.P.) process which is an important treatment before final pulp processing in paper machines which produce a paper product.

Filtration and thickening of pulp is normally accomplished using rotating disc filters to separate the pulp from so-called cloudy white water solution. In this process, pulp fibres attach themselves to both faces of each rotating disc while the discs are submerged in the cloudy white water solution. Then the discs are simply lifted out above the surface by rotation. At a certain predetermined point of disc rotation, thickened pulp is mechanically detached (often by a method called "sluicing") from the two faces of the disc and discharged to a chute for further processing.

It is imperative that the disc faces be thoroughly cleaned with fresh, clean water after removal of the pulp and prior to subsequent reimmersion of the discs into the cloudy white water to complete the rotational cycle.

Improper or inadequate cleaning of the disc faces results in build-up of pulp "lumps" which leads to loss of efficacy caused by plugging of the disc filter itself.

These are two basic types of washing system commonly being used:

(a) "stationary" cleaning showers; and
(b) "oscillating" cleaning showers.

Stationary cleaning showers are simply straight pipes supplied with wash water from a main header, inserted between the rotating discs of the filter and having multiple-spray nozzles pointing towards the disc's surface. Water jets discharging from the nozzles continuously wash the surface of the rotating discs. Such an arrangement is disclosed in U.S. Pat. No. 3,532,220. This particular system offers good cleaning coverage of the disc surface, however, its multiple-nozzle spray arrangement consumes unacceptably high quantities of highly pressurized cleaning water.

"Oscillating" type cleaning showers have normally one or two nozzles located at the end of a supply pipe connected to a similar main supply header. The supply header is mechanically set in oscillating motion causing "pendulum" like motion of the supply pipes between adjacent discs. Consequently, the nozzles located at the end of these supply pipes oscillate between the outer edge of the discs and the main shaft on which the discs are mounted. Such a system is disclosed in a technical brochure on the Impco Disc Filter of Ingersoll-Rand Ltd. in FIGS. 3-2A and 3-3A on pages identified by the numerals BK 46 1072 and BK 47 1069 respectively. This system consumes moderate quantities of wash water but leaves large areas of the disc surface uncleaned during each rotational cycle leading to eventual pulp build-up on the disc surface and subsequent plugging.

OBJECTS OF THE INVENTION

It is an object of the present invention to provide a disc filter washing assembly which combines the advantages but avoids the disadvantages of the above two systems.

It is another object to provide a washing assembly with increased disc coverage.

It is a further object to provide a washing assembly using reduced quantities of washing fluid.

Another object is to provide a rotating washing assembly which provides its own rotational torque.

SUMMARY OF THE INVENTION

In meeting these and other objects, the present invention provides an assembly for washing a face of at least one rotating disc filter mounted on a shaft rotating about a primary axis. The assembly comprises at least one spray element rotatable about a secondary axis parallel to the primary axis in an orbit between the maximum outward extent of the shaft and the outer edge of the disc filter. In other words, the orbit of the element is clear of the hub of the shaft. Each element has at least one orifice directed towards the face of a respective disc filter and is connected to a supply of pressurized washing fluid to be emitted through the orifice onto the face of the filter disc to effect washing thereof. The assembly also comprises means for supplying torque to the element.

In seeking to take advantage of the maximum free space, the secondary axis may advantageously be chosen to be midway between the maximum outward extend (i.e. the hub) of the shaft and the outer edge of the disc filter.

In a preferred case, when more than one disc is coaxially mounted on the shaft, one of the above described washing elements is positioned between each adjacent pair of disc filters. Here the element has at least one orifice directed to a face of one of a pair of adjacent discs while also having at least one orifice directed to the opposite face on the adjacent disc.

Of course a single element may be incorporated to wash the end discs.

The assembly according to the invention combines the most advantageous features of both existing systems by providing excellent coverage of the disc surface while consuming minimal quantities of washing fluid.

The invention will now be described but should not be limited by reference to the following drawings.

BRIEF DESCRIPTION OF THE DRAWINGS

FIG. 2 is a cross-sectional view of the same embodiment;

FIG. 3 shows detail of how torque may be supplied to the spray element;

FIG. 4 is a side view along the line IV—IV of FIG. 1; and

FIG. 5 is a diagrammatic side view similar to FIG. 4 but showing the coverage of the spray element.

DESCRIPTION OF THE PREFERRED EMBODIMENTS

Figure 1:
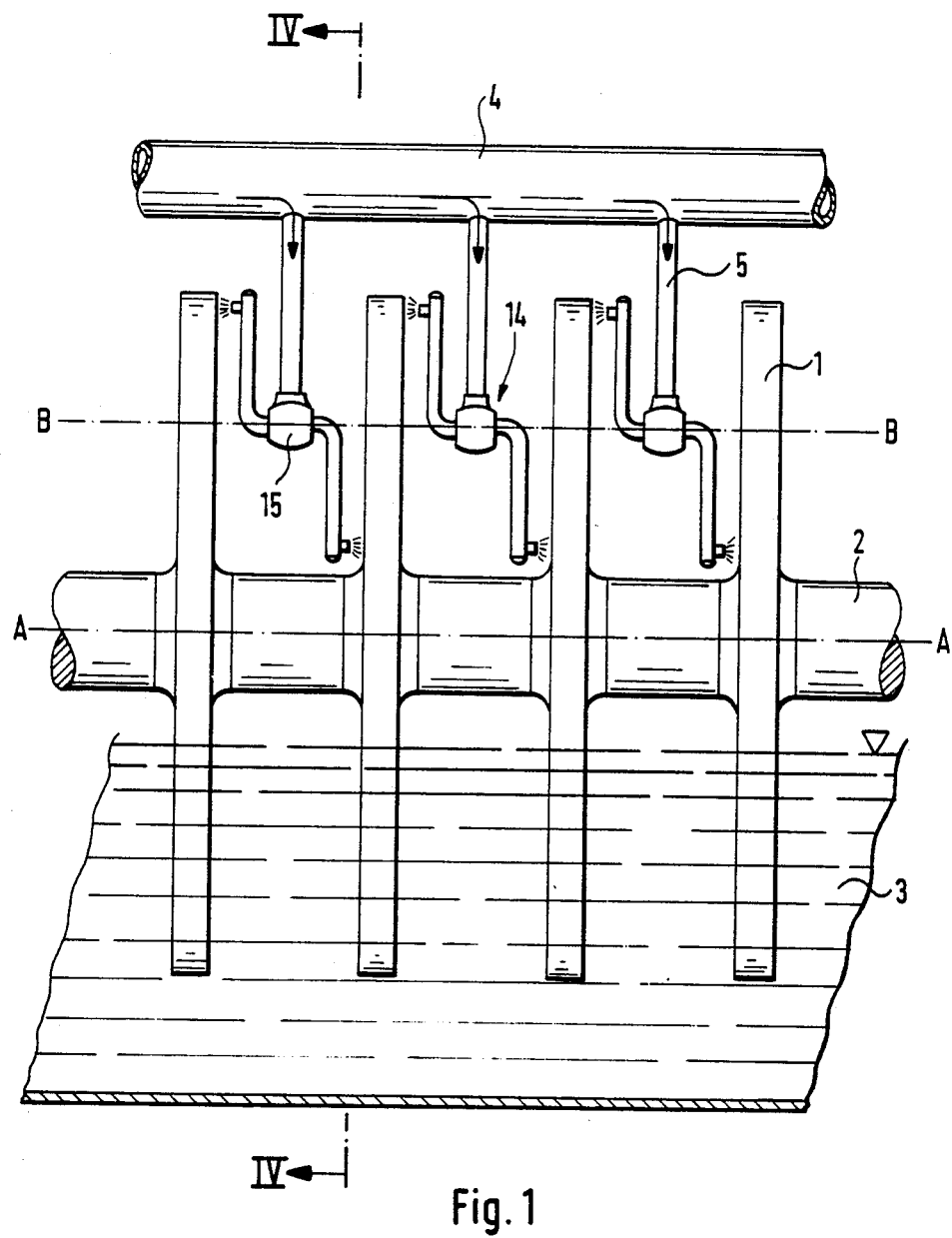
FIG. 1 is a simplified side view of one embodiment of the invention showing only the details of a disc filtration system pertaining to its washing assembly.

In FIG. 1, multiple filter discs (1) are located on a shaft (2) rotating about a primary axis AA. Lower sections of the discs (1) are permanently submerged in the cloudy white water solution (3), where attachment of the pulp fibres suspended in the cloudy white water (3) to the faces of the filtering discs (1) takes place.

There is a main cleaning water supply header (4) located outside the discs' (1) periphery and parallel to the disc filter shaft (2). Supply pipes (5) serving individual spray elements (14) are connected to the common main supply header (4) at their upper ends, and terminate at their lower ends with a fluid distributor (15). The spray elements (14) rotate about a secondary axis BB.

Turning to FIG. 2, there is preferably a pair of L-shaped revolving cleaning pipes (7), coaxially located inside the distributor or branching tee (6) and bent in opposite directions outside of the tee (6). Thus the short arms of the L-shaped pipes are coaxial with the secondary axis BB while the long arms are parallel to the disc filters. As in FIG. 2, the short arms are preferably disposed to each other by 180° as indeed are the long arms. The short arms of each L-shaped pair are preferably joined by a communicating perforated pipe (16). This segment of the cleaning pipe is permanently located inside the branching tee (6) and has multiple perforations (9) allowing flow of cleaning water from the stationary supply pipes (5) and distributor (6) into the revolving L-shaped cleaning pipes (7). A pair of L-shaped pipes (7) may be integral with the perforated pipe (16) to form an overall Z-shape. The position of each L-shaped pipe (7) or the perforated pipe (16) inside the branching tee (6) is insured by means of a pair of stationary bushings (8). The free ends of the L-shaped pipes (7) are closed preferably with caps (13).

The orifices preferably incorporate cleaning nozzles (10) and the orifices are located adjacent to respective ends of the L-shaped pipes (7), so that each orifice is periodically adjacent to the maximum outward extent of the shaft and to &he outer edge. The cleaning nozzles (10) are arranged on the cleaning pipe (7) in such a manner that they form a predetermined angle (angle α—FIG. 3) with the surface of the disc (1)

The washing assembly operates in the following way. High pressure cleaning water (18) is supplied from the main supply header (4), and after passing through the stationary supply pipe (5) it arrives at the branching tee (6). It is then forced to enter the revolving L-shaped pipes (7) by means of the perforations (9) and it finally arrives at the cleaning nozzles (10). From there, a high velocity water jet (11) is discharged towards the respective faces of the discs (1) at the abovementioned predetermined angle (α). Thus the spray has a velocity component parallel to the disc filters (1) and perpendicular to the long arm of the L-shaped pipes (7).

Looking now at FIG. 3, this velocity component causes a reaction force (R) to act on the nozzle (10). This force (R) has two components Rn and Rp, with Rn being perpendicular and Rp being parallel to the disc surface. The Rp component being mechanically unbalanced, sets the whole washing assembly in revolving motion as in FIG. 4.

The revolving motion of the washing assembly combined with the rotational motion of the disc (1), produces, on the surface of the disc (1), a cleaning pattern (12) as shown in FIG. 5. Such a pattern, allowing close to full coverage of the entire disc surface at each disc's rotation, is generated with a minimum number of cleaning nozzles (10), thus ensuring moderate consumption of cleaning water.

Although this invention has been described in relation to preferred embodiments thereof. This is not intended to restrict the generality of the invention whose scope is only limited by the definitions in the appended claims.

What is claimed is:

1. An assembly for washing faces of a plurality of disc filters coaxially mounted on a shaft rotating about a primary axis, the assembly comprising:
   (a) a plurality of spray elements rotatable about a secondary axis parallel to said primary axis in orbits between a maximum outward extend of said shaft and outer edges of said disc filters, the secondary axis being midway between the maximum outward extent of the shaft and the outer edges of the disc filters;
   (b) each of the elements having at least a first orifice directed towards a face of one adjacent disc filter and at least a second orifice directed towards an opposite face of another adjacent disc filter;
   (c) each of said elements being connected to a supply of pressurized washing fluid to be emitted through said orifices onto said faces to effect washing thereof; and
   (d) means for supplying torque to said element.

2. An assembly according to claim 1 wherein each of said elements comprises two L-shaped pipes each having a short arm coaxial with said secondary axis and a long arm parallel to said disc filters and wherein the two short arms are disposed at 180° to each other.

3. An assembly according to claim 2, wherein said short arms are rotatably mounted in a distributor midway between adjacent filter discs and connected to said supply of washing fluid such that said distributor allows said fluid to pass from said supply into the L-shaped pipes.

4. An assembly according to claim 3, wherein said long arms are disposed at 180° to each other.

5. An assembly according to claim 4, wherein said short arms are joined by a communicating perforated cylindrical pipe along the secondary axis such that washing fluid from said supply passes into said perforated pipe and into said short arms.

6. An assembly according to claim 5, wherein said perforated pipe is sealingly enclosed within said distributor which is supplied with said washing fluid by a pipe disposed between adjacent disc filters.

7. An assembly according to claim 6, wherein said torque supplying means comprises nozzles on said orifices at an angle to respective faces to provide thereon a spray having a velocity component parallel to said faces and perpendicular to said long arm of respective L-shaped pipes.

8. An assembly according to claim 3, comprising a plurality of said L-shaped pipes whose short arms are interconnected and rotatably mounted in said distributor.

* * * * *